(12) United States Patent
Kosaka et al.

(10) Patent No.: US 10,422,655 B2
(45) Date of Patent: Sep. 24, 2019

(54) VEHICULAR DISPLAY DEVICE AND VEHICULAR DISPLAY METHOD

(71) Applicant: NISSAN MOTOR CO., LTD., Kanagawa (JP)

(72) Inventors: Norio Kosaka, Kanagawa (JP); Tetsuya Yamamoto, Kanagawa (JP); Hiroshi Watanabe, Kanagawa (JP); Masayuki Shishido, Kanagawa (JP); Kenji Maruyama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/767,063

(22) PCT Filed: Oct. 9, 2015

(86) PCT No.: PCT/JP2015/078779
§ 371 (c)(1),
(2) Date: Apr. 9, 2018

(87) PCT Pub. No.: WO2017/061035
PCT Pub. Date: Apr. 13, 2017

(65) Prior Publication Data
US 2018/0306597 A1 Oct. 25, 2018

(51) Int. Cl.
*G01C 21/36* (2006.01)
*G02B 27/01* (2006.01)
(Continued)

(52) U.S. Cl.
CPC ............ *G01C 21/365* (2013.01); *B60K 35/00* (2013.01); *G02B 27/0101* (2013.01);
(Continued)

(58) Field of Classification Search
CPC .. G01C 21/365; G02B 27/0101; B60K 35/00; G09G 2380/10; G09G 2310/08
See application file for complete search history.

(56) References Cited

U.S. PATENT DOCUMENTS 6,567,744 B1 * 5/2003 Katayama .............. G01C 21/36
701/410
6,972,696 B2 12/2005 Rogers et al.
(Continued)

FOREIGN PATENT DOCUMENTS

JP H07-257228 A 10/1995
JP 2005-214730 A 8/2005
(Continued)

*Primary Examiner* — David Tung
(74) *Attorney, Agent, or Firm* — Osha Liang LLP

(57) ABSTRACT

A vehicular display device includes a display configured to display an image in a display area that overlaps a position of a windshield of a vehicle, a display processor configured to display a direction guide image in the display area in a manner superimposed on a road on which the vehicle is traveling, the direction guide image being an image showing a turn position where the vehicle is to make a turn on the road, and a display pattern determiner configured to determine a display pattern of the direction guide image based on a traveling speed of the vehicle. The display pattern determiner determines the display pattern such that, the higher the traveling speed is, the longer a length from a top end to a bottom end of the direction guide image is.

2 Claims, 11 Drawing Sheets

(51) Int. Cl.
*G09G 5/377* (2006.01)
*B60K 35/00* (2006.01)

(52) U.S. Cl.
CPC ........ *G09G 5/377* (2013.01); *B60K 2370/179* (2019.05); *B60K 2370/334* (2019.05); *G09G 2310/08* (2013.01); *G09G 2380/10* (2013.01)

(56) References Cited

U.S. PATENT DOCUMENTS

| | | | |
|---|---|---|---|
| 7,284,782 B2* | 10/2007 | Uenuma | B60J 1/00 296/84.1 |
| 7,287,884 B2 | 10/2007 | Koike | |
| 2003/0147247 A1 | 8/2003 | Koike | |
| 2004/0189831 A1* | 9/2004 | Shibatani | H04N 5/232 348/240.99 |
| 2014/0092250 A1* | 4/2014 | Nagasawa | G01C 21/3602 348/148 |
| 2014/0118133 A1* | 5/2014 | Oba | B60K 37/02 340/441 |
| 2016/0147073 A1* | 5/2016 | Onda | G02B 27/01 345/7 |
| 2016/0313562 A1* | 10/2016 | Saisho | G02B 27/0179 |
| 2016/0327402 A1* | 11/2016 | Funabiki | G01C 21/365 |

FOREIGN PATENT DOCUMENTS

| | | |
|---|---|---|
| JP | 2006-343194 A | 12/2006 |
| JP | 2013-196359 A | 9/2013 |
| KR | 10-2003-0067549 A | 8/2003 |
| WO | 2005/121707 A2 | 12/2005 |
| WO | 2015/118859 A1 | 8/2015 |

\* cited by examiner

VEHICULAR DISPLAY DEVICE AND VEHICULAR DISPLAY METHOD

BACKGROUND

Technical Field

The present invention relates to a vehicular display device such as a head-up display mounted in a vehicle and to a vehicular display method.

Related Art

In recent years, vehicles such as automobiles have begun to use a vehicular display device or so-called head-up display which displays an image along with an object viewed by a driver through a windshield of a vehicle.

For example, there is known a head-up display which displays multiple coin-shaped icon images on a road on which a vehicle is traveling to show a direction to travel and prompt a driver to perform an appropriate driving operation (see Patent Literature 1).

CITATION LIST

Patent Literature

Patent Literature 1: Japanese Patent Application Publication No. 2013-196359

SUMMARY OF INVENTION

A head-up display like one described above displays the multiple coin-shaped icon images on the road on which the vehicle is traveling in a superimposed manner to show the driver a position where the vehicle is to make a turn such as an intersection.

A display pattern of such images is constant irrespective of the traveling speed of the vehicle. However, how the road appears to the driver and the time it takes to reach the position to make a turn vary depending on the traveling speed of the vehicle.

Accordingly, when the traveling speed is high, there is a risk that the position to make a turn cannot be shown to the driver with a sufficient margin. Meanwhile, when the traveling speed is low, the image is displayed far before the position to make a turn and this is bothering. Moreover, there is a risk that the driver erroneously recognizes a different intersection before the position to make a turn as the position to make a turn.

One or more embodiments of the present invention provides a vehicular display device and a vehicular display method which can more surely show a driver a position to make a turn at any traveling speed when displaying an image along with an object such as a road viewed by the driver through a windshield of a vehicle.

A vehicular display device according to one or more embodiments of the present invention displays an image in a display area provided to overlap a position of a windshield included in a vehicle. The vehicular display device according to one or more embodiments of the present invention includes: a display configured to display an image in the display area; a display processor configured to display a direction guide image in the display area, the direction guide image showing a turn position where the vehicle is to make a turn; and a display pattern determiner configured to determine a display pattern of the direction guide image based on a traveling speed of the vehicle.

The display pattern determiner according to one or more embodiments of the present invention determines the display pattern such that the higher the traveling speed of the vehicle is, the longer a length from a top end to a bottom end of the direction guide image is. The display processor according to one or more embodiments of the present invention displays the direction guide image in the display area based on the display pattern determined by the display pattern determiner.

A vehicular display device according to one or more embodiments of the present invention displays an image in a display area provided to overlap a position of a windshield included in a vehicle. The vehicular display device according to one or more embodiments of the present invention includes: a display configured to display an image in the display area; a display processor configured to display a direction guide image in the display area, the direction guide image showing a turn position where the vehicle is to make a turn; and a display pattern determiner configured to determine a display pattern of the direction guide image based on a traveling speed of the vehicle.

The display pattern determiner according to one or more embodiments of the present invention determines the display pattern such that the higher the traveling speed is, the larger a distance between a position corresponding to the turning position in the display area and a bottom end of the direction guide image is. The display processor according to one or more embodiments of the present invention displays the direction guide image in the display area based on the display pattern determined by the display pattern determiner.

DETAILED DESCRIPTION

Figure 1:
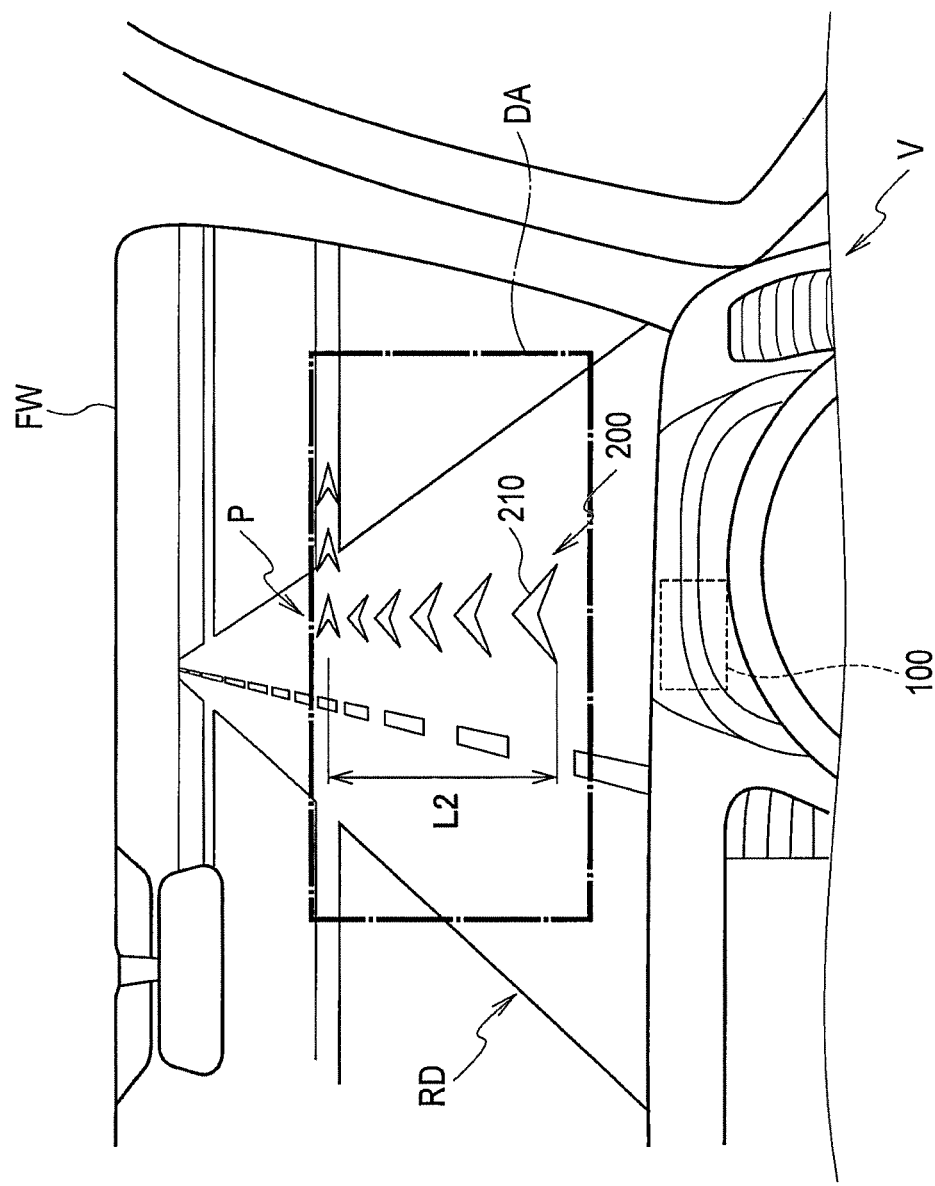
FIG. 1 is a schematic view of a vehicle V in which a vehicular display device 100 is mounted.

Embodiments are described below based on the drawings. Note that the same functions and configurations are denoted by the same or similar reference numerals and description thereof is omitted as appropriate. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Schematic Configuration of Vehicle in which Vehicular display device is Mounted]

FIG. 1 is a schematic view of a vehicle V in which a vehicular display device 100 according to one or more embodiments of the present invention is mounted. Specifically, FIG. 1 illustrates a view from a driver seat of the vehicle V.

As illustrated in FIG. 1, the vehicular display device 100 is mounted in the vehicle V. The vehicular display device 100 displays an image in a display area DA provided to overlap the position of a windshield FW included in the vehicle V.

Specifically, the vehicular display device 100 displays an image in the display area DA along with an object viewed by a driver through the windshield FW. In other words, the vehicular display device 100 includes a head-up display (HUD). Particularly, the vehicular display device 100 functions as an augmented reality head-up display (AR-HUD) which can display a virtual symbol (image) along with the object viewed by the driver through the windshield FW.

The display area DA is provided to overlap a partial area of the windshield FW as viewed from the viewpoint of the driver seating on the driver seat. Although the specific position of the display area DA is not particularly limited, the display area DA is generally provided in a partial area of the windshield FW which includes the driver seat side.

Moreover, in one or more embodiments of the present invention, the vehicular display device 100 displays a direction guide image 200 in the display area DA, the direction guide image 200 being an image showing a direction in which the vehicle V is to travel. Specifically, the direction guide image 200 is an image showing a turning position P where the vehicle V is to make a turn on a road RD on which the vehicle V is traveling.

The direction guide image 200 is configured by multiple guide icons 210. The guide icons 210 are wedge-shaped icons showing the direction in which the vehicle V is to travel. The direction guide image 200 is displayed in the display area DA to be superimposed on the road RD in front of the vehicle V in the traveling direction thereof.

Note that the shape of the guide icons 210 is not limited to the wedge shape as illustrated in FIG. 1. For example, the guide icons 210 may be coin-shaped icons, arrow-shaped icons, or the like. In other words, the guide icons 210 may have any shape as long as the guide icons 210 can show the direction in which the vehicle V is to travel (make a turn).

A left or right turn at an intersection, a turn to a side road, a branching road, and the like can be given as typical examples of the turning position P. Note that the turning position P does not have to be a position where the road RD branches. For example, a curve with a large curvature can be set as the turning position P.

Note that, although the vehicle V in which the vehicular display device 100 is mounted is typically a four-wheel passenger vehicle (including an SUV and a minivan), the vehicle V may be a truck, a bus, or the like as a matter of course.

[Functional Block Configuration of Vehicular Display Device]

Figure 2:
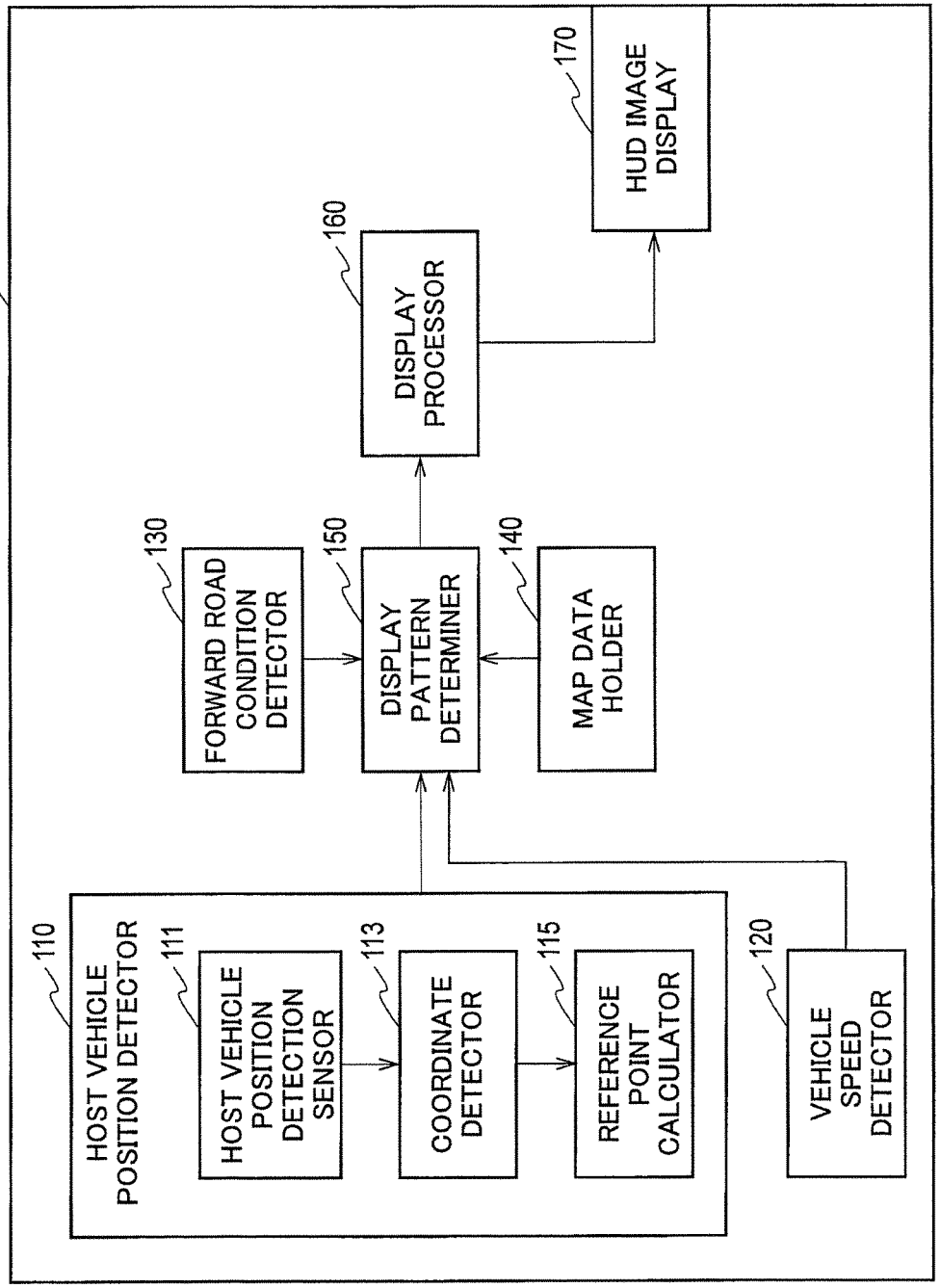
FIG. 2 is a functional block configuration diagram of the vehicular display device 100.

FIG. 2 is a functional block configuration diagram of the vehicular display device 100. As illustrated in FIG. 2, the vehicular display device 100 includes a host vehicle position detector 110, a vehicle speed detector 120, a forward road condition detector 130, a map data holder 140, a display pattern determiner 150, a display processor 160, and a HUD image display 170. Note that the functional blocks are configured by information processors such as a CPU and by storage devices such as a memory and a hard disk drive.

The host vehicle position detector 110 detects the position of the vehicle V (host vehicle). Specifically, the host vehicle position detector 110 includes a host vehicle position detection sensor 111, a coordinate detector 113, and a reference point calculator 115. The host vehicle position detection sensor 111 is configured by a sensor group which detects the position of the vehicle V. A GPS receiver which receives signals from the Global Positioning System (GPS), a gyroscope sensor which outputs signals corresponding to the angle and angular velocity of the vehicle V, and the like are used as the sensor group.

Moreover, a steering angle sensor which detects the steering angle of the vehicle V and a camera which captures a front image in a traveling direction of the vehicle V may be used in the host vehicle position detection sensor 111.

The coordinate detector 113 detects coordinate data of the vehicle V in a three-dimensional space, based on the position of the vehicle V detected by the host vehicle position detector 110.

The reference point calculator 115 calculates a reference point of the direction guide image 200 to be displayed in the display area DA, based on the coordinate data of the vehicle V detected by the coordinate detector 113.

Specifically, the reference point calculator 115 calculates the position (not illustrated in FIG. 2, see FIGS. 4A and 4B) of the guide icon 210 to be displayed bottommost in the display area DA out of the multiple guide icons 210 to be displayed in the display area DA, based on the current position of the vehicle V.

The vehicle speed detector 120 detects the traveling speed (vehicle speed) of the vehicle V. Specifically, the vehicle speed detector 120 includes a signal generator which outputs pulse signals corresponding to the number of revolutions of an axle in the vehicle V and a sensor which detects the traveling speed of the vehicle V based on the pulse signals.

Note that the vehicle speed detector 120 may detect the traveling speed of the vehicle V based on the signals received by the GPS receiver.

The forward road condition detector 130 detects the condition of the road RD in front of the vehicle V, the road RD being a road on which the vehicle V is traveling. Specifically, the forward road condition detector 130 includes a camera which captures a front image in the traveling direction of the vehicle V and executes processing based on the image data captured by the camera.

More specifically, the forward road condition detector 130 detects the distance between the current position of the vehicle V and a certain position (turning position P such as an intersection or an entrance of a side road) on the road RD, the shape of the road RD, and the like.

The map data holder 140 holds data on a road map. Specifically, the map data holder 140 holds data on a road map used in a route guidance device (navigation system, not illustrated) mounted in the vehicle V.

Moreover, the map data holder 140 provides the data on the road map to the display pattern determined 150. The data on the road map is used in the display pattern determiner 150 to determine the positions of intersections on the road RD and positions of side roads.

The display pattern determiner 150 determines a display pattern of the direction guide image 200 to be displayed in the display area DA. Specifically, the display pattern determiner 150 determines the display pattern of the direction guide image 200 showing the turning position P where the vehicle V is to make a turn, based on the data which is provided by the forward road condition detector 130 to indicate the condition of the road RD and the data on the road map which is provided by the map data holder 140.

More specifically, the display pattern determiner 150 determines the display pattern of the direction guide image 200 based on the traveling speed of the vehicle V. The display pattern is described more specifically below.

The display pattern determiner 150 can determine the display pattern such that the higher the traveling speed of the vehicle V is, the longer the length from the top end T to the bottom end B (see FIGS. 4A and 4B) of the direction guide image 200 is. In other words, the display pattern determiner 150 can determine the display pattern such that the aforementioned length increases with an increase in the traveling speed of the vehicle V.

Moreover, the display pattern determiner 150 can determine the display pattern such that the higher the traveling speed of the vehicle V is, the longer the length of the direction guide image 200 along the road RD is.

As described above, the direction guide image 200 includes the multiple guide icons 210 which show the traveling direction of the vehicle and which are arranged along the road RD. The display pattern determiner 150 can determine the display pattern such that the higher the traveling speed of the vehicle V is, the greater the number of the guide icons 210 is.

Alternatively, the display pattern determiner 150 can determine the display pattern such that the higher the traveling speed of the vehicle V is, the larger the intervals between the guide icons 210 are.

Moreover, the display pattern determiner 150 can determine the display pattern such that the higher the traveling speed of the vehicle V is, the larger the distance between a position corresponding to the turning position P in the display area DA and the bottom end B of the direction guide image 200 is.

Furthermore, when the turning position P of the vehicle V is a position where a turn to a side road SW (not illustrated in FIG. 2, see FIGS. 10A and 10B) of the road RD is to be started, the display pattern determiner 150 can determine the display pattern such that the higher the traveling speed of the vehicle V is, the earlier the timing of starting the display of the direction guide image 200 is.

The display processor 160 executes processing of an image displayed in the display area DA. Specifically, the display processor 160 displays the direction guide image 200 in the display area DA such that the direction guide image 200 is superimposed on the road RD on which the vehicle V is traveling.

More specifically, the display processor 160 displays the direction guide image 200 in the display area DA based on the display pattern of the direction guide image 200 determined by the display pattern determiner 150.

The HUD image display 170 is a head-up display (HUD) which displays images in the display area DA. In one or more embodiments of the present invention, the HUD image display 170 forms a display.

As described above, the HUD image display 170 is an augmented reality head-up display (AR-HUD) which can display a virtual symbol (direction guide image 200 and the like) along with the object viewed by the driver through the windshield FW.

In one or more embodiments of the present invention, the HUD image display 170 displays a desired image on a liquid crystal display or the like and reflects this image by using a mirror to display the image on the windshield FW as a virtual image.

[Operation of Vehicular Display Device]

Figure 3:
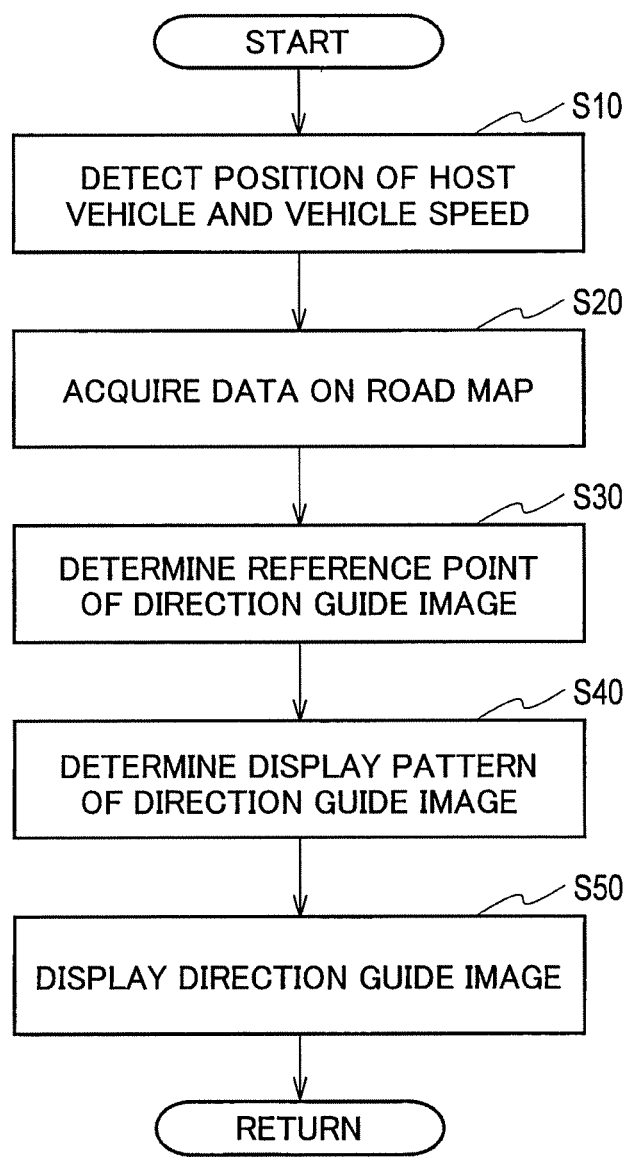
FIG. 3 illustrates an operation flow of displaying a direction guide image performed by the vehicular display device 100.

FIG. 3 illustrates an operation flow of displaying the direction guide image performed by the vehicular display device 100. As illustrated in FIG. 3, the vehicular display device 100 detects the position of the vehicle V (host vehicle) and the traveling speed (vehicle speed) of the vehicle V (S10).

The vehicular display device 100 acquires the data on the road map based on the detected position of the host vehicle (S20). Specifically, the vehicular display device 100 acquires data on the road RD located in front of the vehicle V in the traveling direction thereof.

The vehicular display device 100 determines the reference point of the direction guide image 200 to be displayed in the display area DA, based on the acquired data on the road RD (S30).

Specifically, the vehicular display device 100 detects the coordinate data of the vehicle V in a three-dimensional space, based on the detected position of the vehicle V. Moreover, the vehicular display device 100 calculates the reference point of the direction guide image 200 to be displayed in the display area DA, based on the detected coordinate data of the vehicle V.

The vehicular display device 100 determines the display pattern of the direction guide image 200 (S40). Specifically, the vehicular display device 100 determines the display pattern of the direction guide image 200 depending on the vehicle speed of the vehicle V.

As described above, the direction guide image 200 is an image showing the turning position P where the vehicle V is to make a turn on the road RD on which the vehicle V is traveling. The vehicular display device 100 changes the size (length) of the direction guide image 200 displayed in the display area DA, the number of the guide icons 210 forming the direction guide image 200, and the intervals between the guide icons 210, depending on the vehicle speed of the vehicle V.

Note that specific display examples of the direction guide image 200 are described later.

The vehicular display device 100 displays the direction guide image 200 in the display area DA, based on the determined display pattern (S50).

[Examples Image Display by Vehicular Display Device]

Next, display examples of the direction guide image 200 by the vehicular display device 100 are described with reference to FIGS. 4A to 11B.

(1) Display Example 1

Figure 4A:
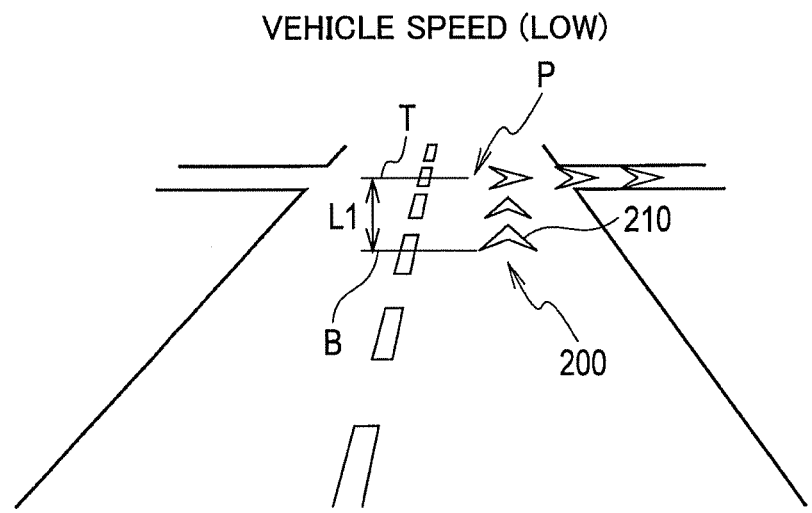
FIGS. 4A and 4B are views explaining a display example 1 of a direction guide image 200 by the vehicular display device 100.
Figure 4B:
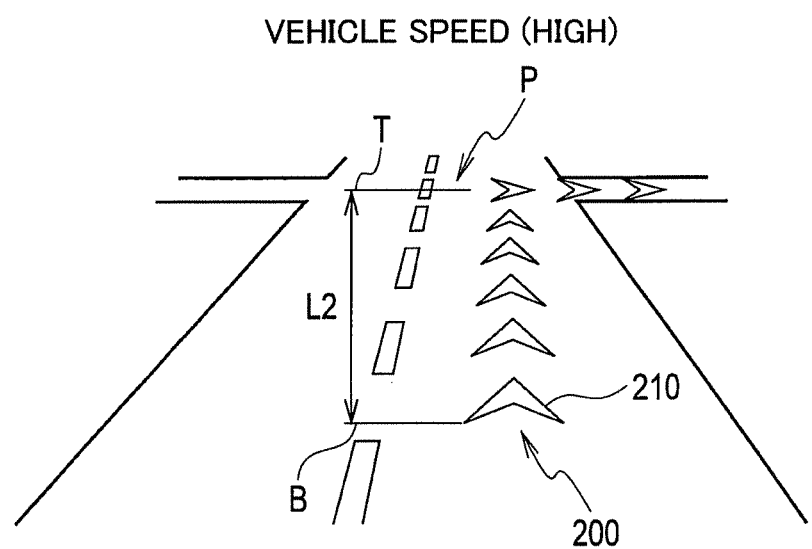

FIGS. 4A and 4B are views explaining a display example 1 of the direction guide image 200 by the vehicular display device 100. Specifically, FIG. 4A illustrates a display example of the direction guide image 200 in the case where the vehicle speed of the vehicle V is low. FIG. 4B illustrates a display example of the direction guide image 200 in the case where the vehicle speed of the vehicle V is high.

Note that, although the display area DA (see FIG. 1) is not illustrated in FIGS. 4A and 4B, the direction guide image 200 configured by the multiple guide icons 210 is assumed to be displayed in the display area DA (the same applies to the following display examples). The direction guide image 200 is curved to the right by about 90 degrees at the turning position P (intersection).

As illustrated in FIG. 4A, when the vehicle speed is low (for example, less than 40 km/h), the length (display start distance) of the direction guide image 200 in the traveling direction of the vehicle V is L1. Meanwhile, as illustrated in FIG. 4B, when the vehicle speed is high (for example, 40 km/h or more), the length of the direction guide image 200 in the traveling direction of the vehicle V is L2. As illustrated in FIGS. 4A and 4B, L2 is longer than L1.

As described above, in the display example 1, there is used such a display pattern that the higher the traveling speed (vehicle speed) of the vehicle V is, the longer the length from the top end T to the bottom end B of the direction guide image 200 is.

Figure 5A:
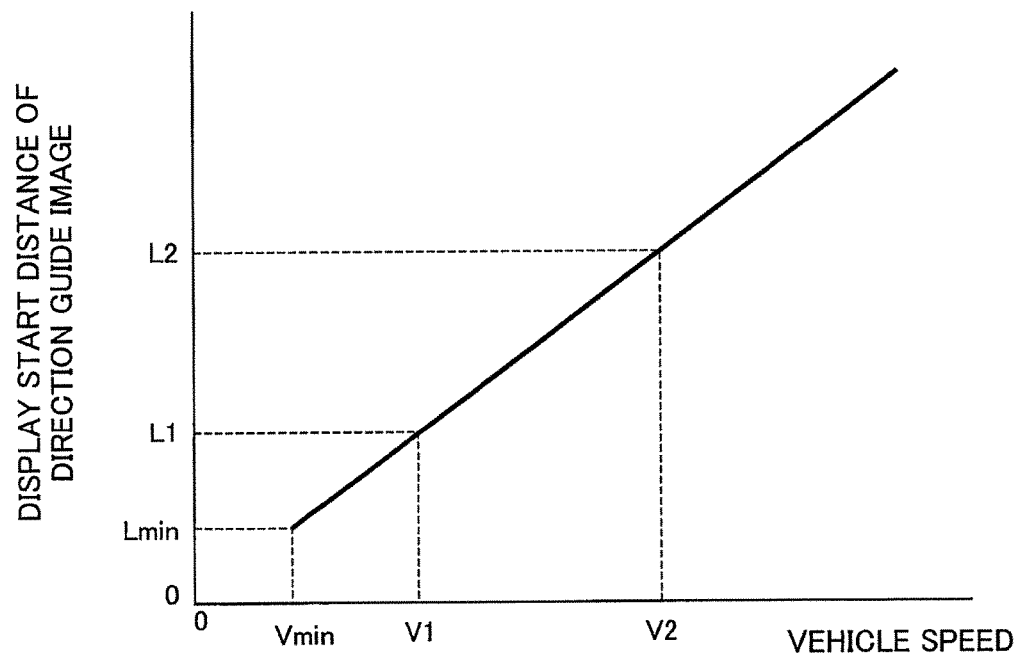
FIGS. 5A and 5B are graphs illustrating relationships between a vehicle speed and a display start distance of the direction guide image 200.
Figure 5B:
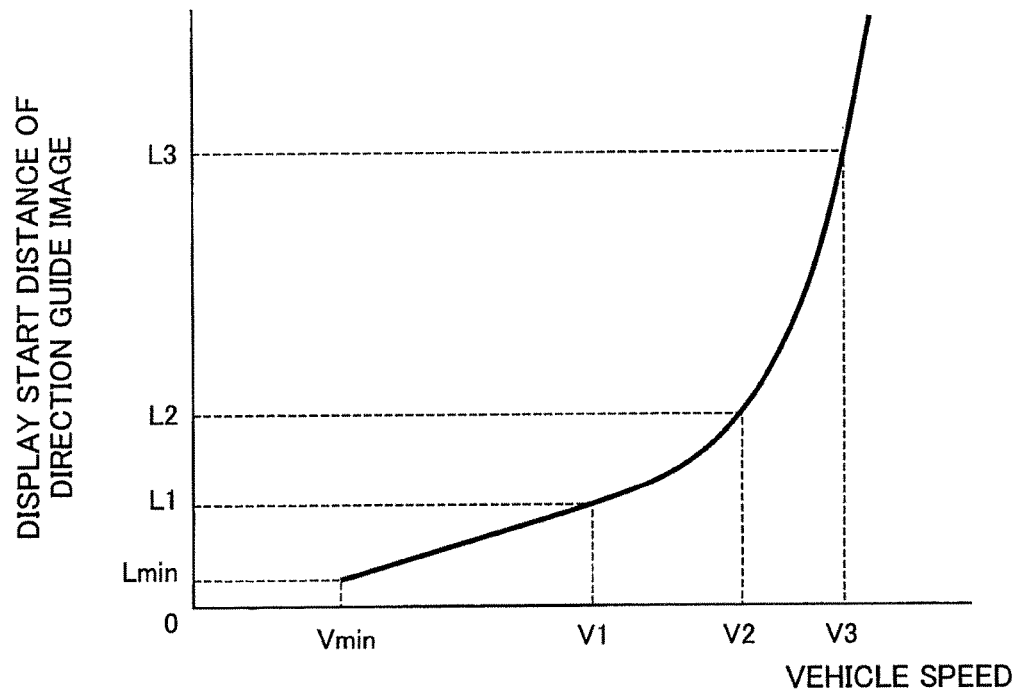

FIGS. 5A and 5B are graphs illustrating relationships between the vehicle speed and the display start distance of the direction guide image 200.

The graph shown in FIG. 5A illustrates a relationship in which the display start distance of the direction guide image 200 increases in direct proportion to an increase in the vehicle speed (in other words, a linear relationship). Note that the display start distance is the distance between the turning position P and the bottom end B of the direction guide image 200.

Moreover, the graph shown in FIG. 5B illustrates a relationship in which the display start distance of the direction guide image 200 increases quadratically as the vehicle speed increases.

Based on which one of the relationships illustrated in FIGS. 5A and 5B, the direction guide image 200 is displayed may be changed depending on the type of the road RD (for example, a natural road or a toll road) on which the vehicle V is traveling, the type of the vehicle V (a sports car or a truck), and the like.

Alternatively, switching between the two relationships may be performed depending on the vehicle speed. For example, the vehicular display device 100 may use the linear relationship illustrated in FIG. 5A in a low speed range and use the quadratic relationship illustrated in FIG. 5B in a high speed range (for example, 100 km/h or more).

(2) Display Example 2

Figure 6A:
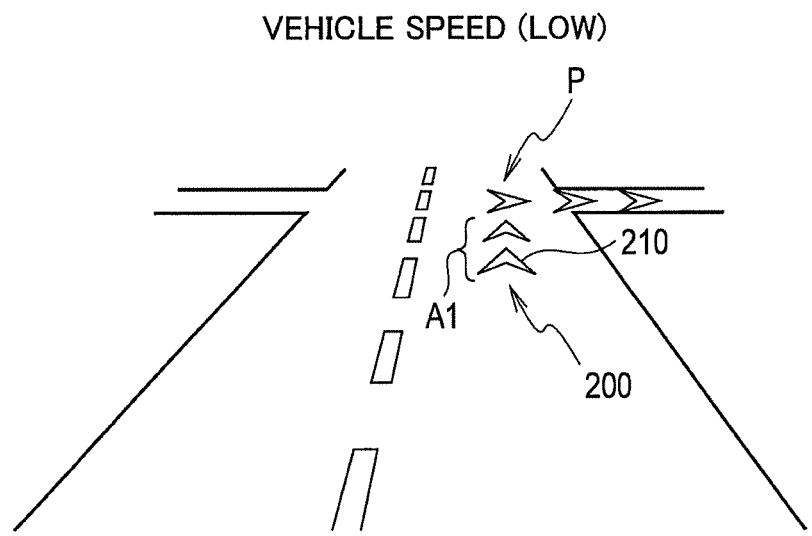
FIGS. 6A and 6B are views explaining a display example 2 of the direction guide image 200 by the vehicular display device 100.
Figure 6B:
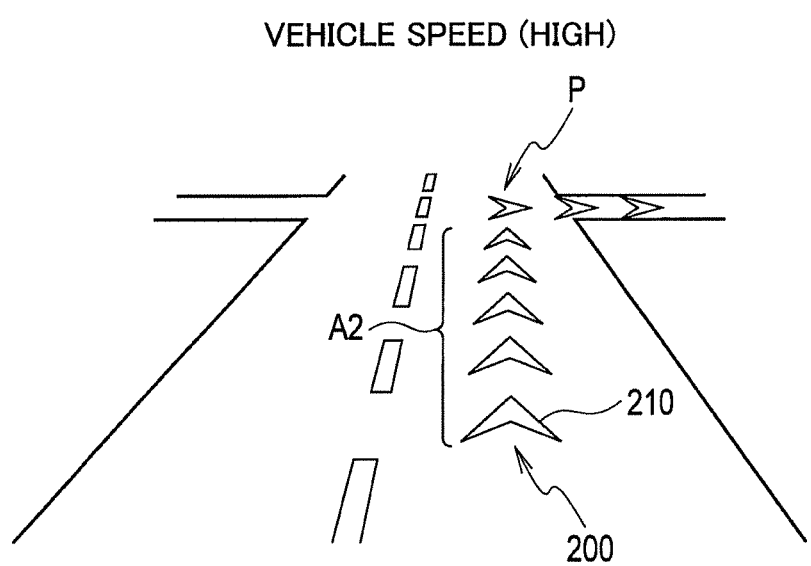
Figure 7A:
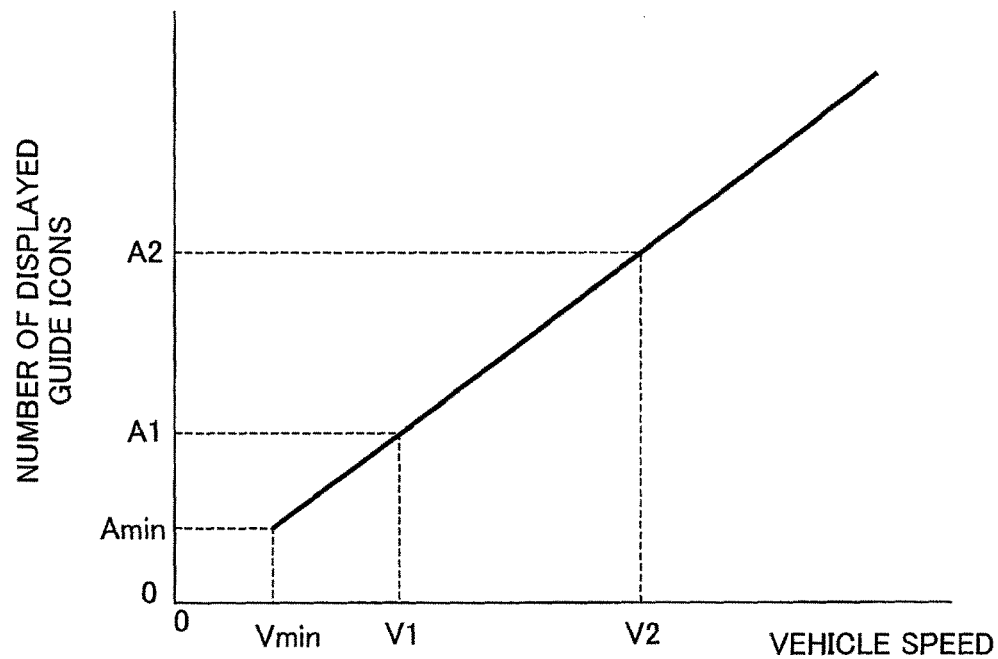
FIGS. 7A and 7B are graphs illustrating relationships between the vehicle speed and the number of displayed guide icons 210.
Figure 7B:
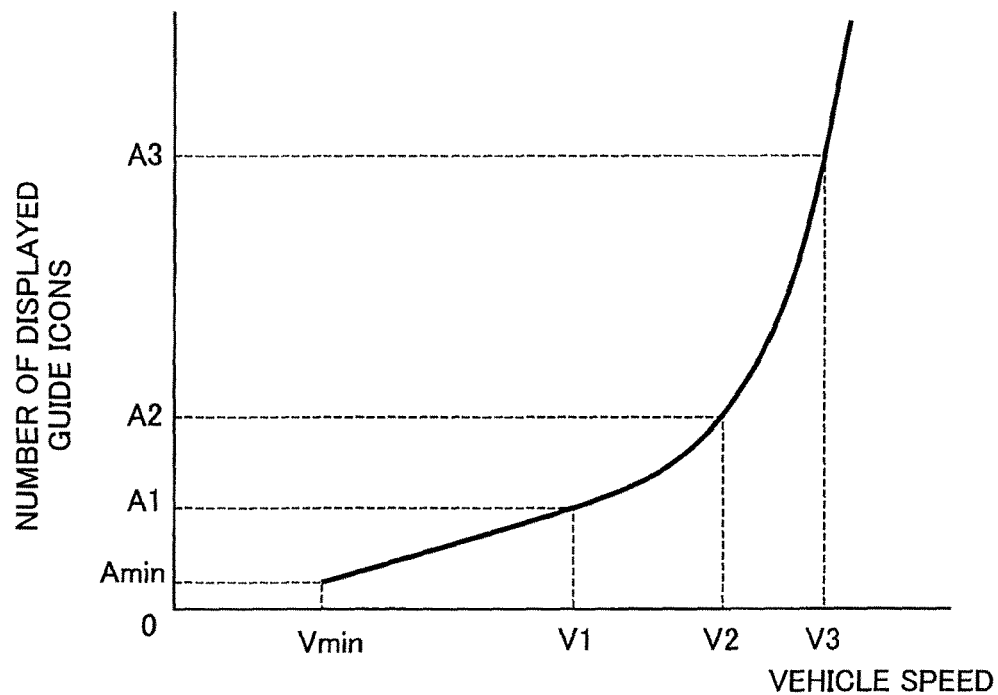

FIGS. 6A and 6B are views explaining a display example 2 of the direction guide image 200 by the vehicular display device 100. FIGS. 7A and 7B are graphs illustrating relationships between the vehicle speed and the number of the displayed guide icons 210.

Portions different from those in the aforementioned display example 1 are mainly described below and description of the same portions is omitted as appropriate.

FIG. 6A illustrates a display example of the direction guide image 200 in the case where the vehicle speed of the vehicle V is low. FIG. 6B illustrates a display example of the direction guide image 200 in the case where the vehicle speed of the vehicle V is high.

As illustrated in FIG. 6A, when the vehicle speed is low, the number of the displayed guide icons 210 in the traveling direction of the vehicle V is A1. Meanwhile, as illustrated in FIG. 6B, when the vehicle speed is high, the number of the displayed guide icons 210 in the traveling direction of the vehicle V is A2. As illustrated in FIGS. 6A and 6B, A2 (five) is greater than A1 (two).

As described above, in the display example 2, there is used such a display pattern that the higher the traveling speed (vehicle speed) of the vehicle V is, the greater the number of the guide icons 210 is.

The graph shown in FIG. 7A illustrates a relationship in which the number of the displayed guide icons 210 increases in direct proportion to an increase in the vehicle speed (in other words, a linear relationship). Note that the number of the displayed guide icons 210 is the number of the guide icons 210 between the turning position P (that is the top end T of the direction guide image 200) and the bottom end B of the direction guide image 200.

The graph shown in FIG. 7B illustrates a relationship in which the number of the displayed guide icons 210 increases quadratically as the vehicle speed increases. As in the display example 1, based on which one of the relationships illustrated in FIGS. 7A and 7B, the direction guide image 200 is displayed may be changed depending on the type of the road RD on which the vehicle V is traveling, the type of the vehicle V, and the like (the same applies in the following display examples).

(3) Display Example 3

Figure 8A:
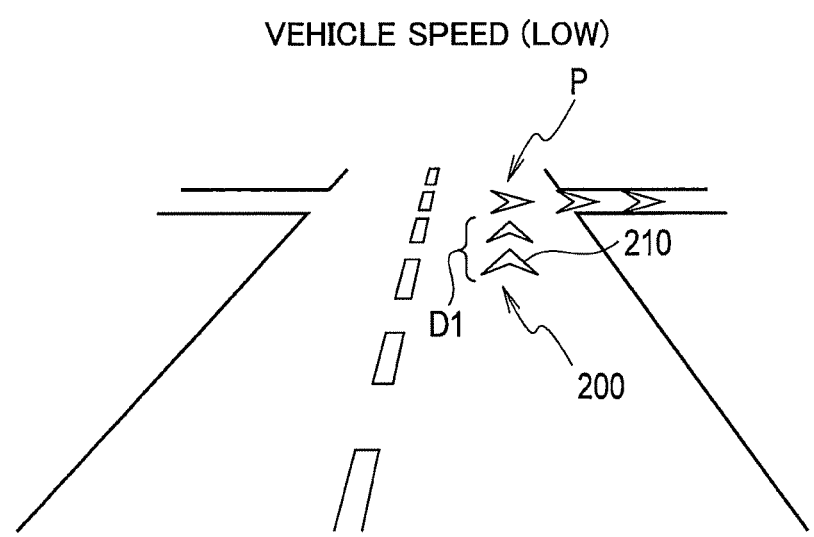
FIGS. 8A and 8B are views explaining a display example 3 of the direction guide image 200 by the vehicular display device 100.
Figure 8B:
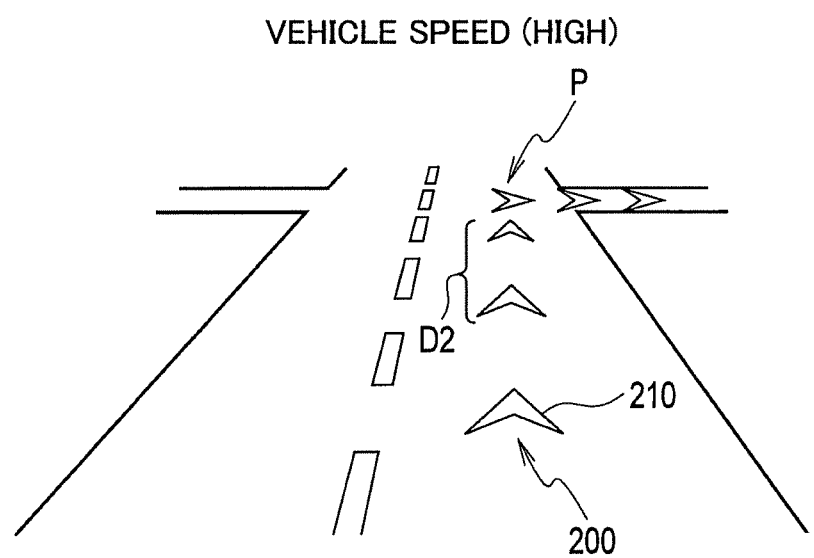
Figure 9A:
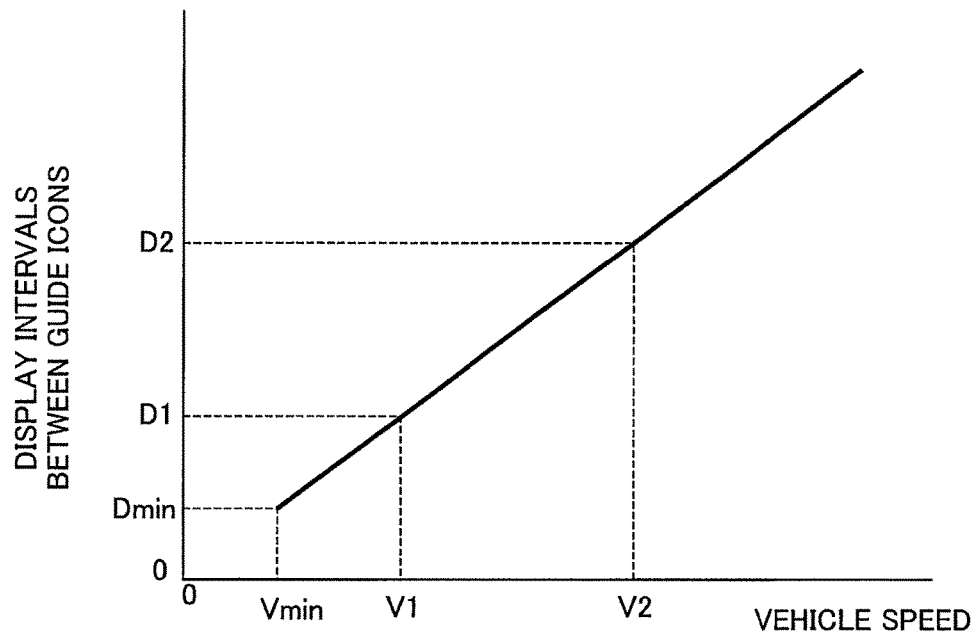
FIGS. 9A and 9B are graphs illustrating relationships between the vehicle speed and display intervals between the guide icons 210.
Figure 9B:
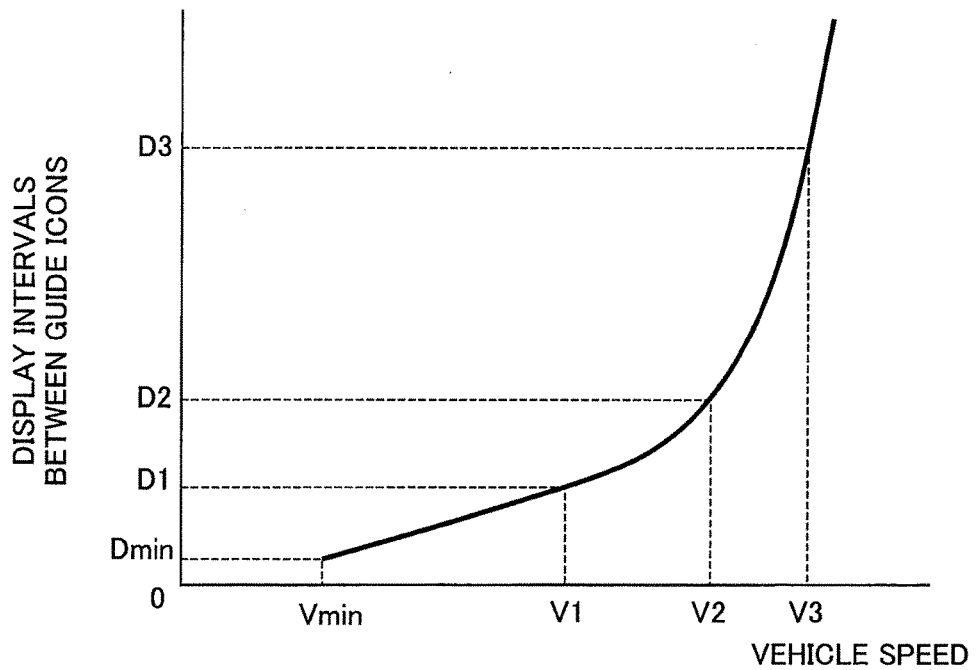

FIGS. 8A and 8B are views explaining a display example 3 of the direction guide image 200 by the vehicular display device 100. FIGS. 9A and 9B are graphs illustrating relationships between the vehicle speed and the display intervals between the guide icons 210.

FIG. 8A illustrates a display example of the direction guide image 200 in the case where the vehicle speed of the vehicle V is low. FIG. 8B illustrates a display example of the direction guide image 200 in the case where the vehicle speed of the vehicle V is high.

As illustrated in FIG. 8A, when the vehicle speed is low, the display intervals between the guide icons 210 in the traveling direction of the vehicle V are D1. Meanwhile, as illustrated in FIG. 8B, when the vehicle speed is high, the display intervals between the guide icons 210 in the traveling direction of the vehicle V are D2. As illustrated in FIGS. 8A and 8B, D2 is larger than D1.

As described above, in the display example 3, there is used such a display pattern that the higher the traveling speed (vehicle speed) of the vehicle V is, the larger the intervals between the guide icons 210 are.

The graph shown in FIG. 9A illustrates a relationship in which the display intervals between the guide icons 210 increase in direct proportion to an increase in the vehicle speed (in other words, a linear relationship). Note that the display intervals between the guide icons 210 are intervals between the adjacent guide icons 210 between the turning position P (that is the top end T of the direction guide image 200) and the bottom end B of the direction guide image 200.

The graph shown in FIG. 9B illustrates a relationship in which the display intervals between the guide icons 210 increase quadratically as the vehicle speed increases.

(4) Display Example 4

Figure 10A:
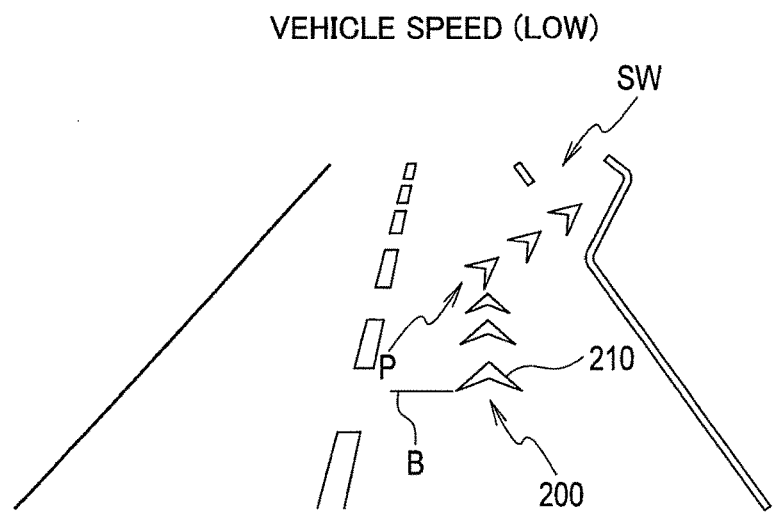
FIGS. 10A and 10B are views explaining a display example 4 of the direction guide image 200 by the vehicular display device 100.
Figure 10B:
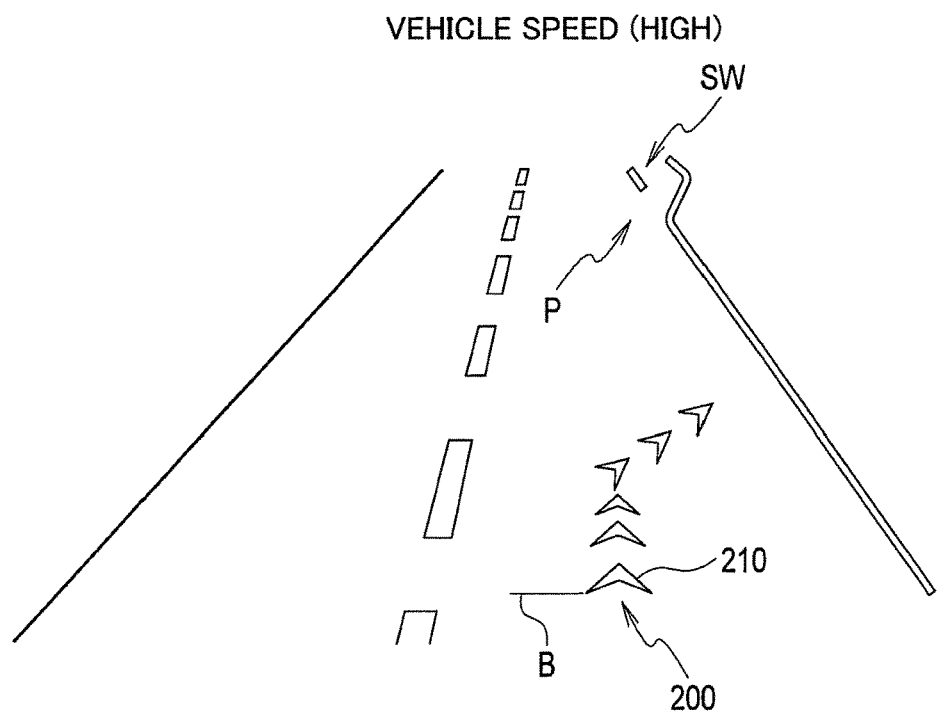
Figure 11A:
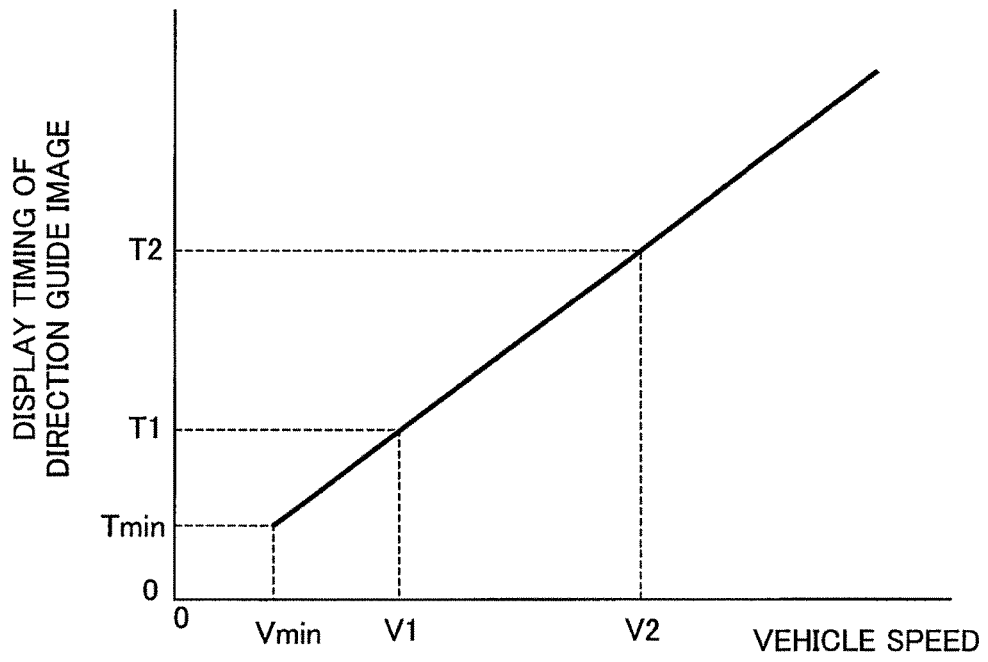
FIGS. 11A and 11B are graphs illustrating relationships between the vehicle speed and the display timing of the direction guide image 200.
Figure 11B:
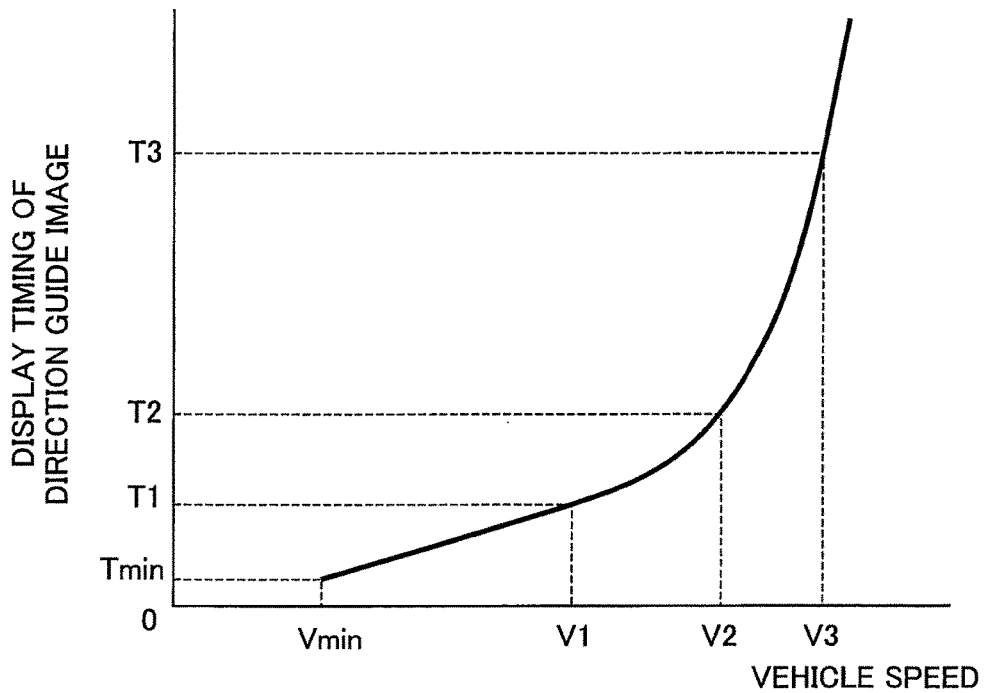

FIGS. 10A and 10B are views explaining a display example 4 of the direction guide image 200 by the vehicular display device 100. FIGS. 11A and 11B are graphs illustrating relationships between the vehicle speed and the display timing of the direction guide image 200.

FIG. 10A illustrates a display example of the direction guide image 200 in the case where the vehicle speed of the vehicle V is low. FIG. 10B illustrates a display example of the direction guide image 200 in the case where the vehicle speed of the vehicle V is high.

The display example 4 is different from the display examples 1 to 3 in that the turning position P of the vehicle V is not an intersection on the road RD but is an entrance point to the side road SW of the road RD. Side roads provided in an interchange of an expressway and in a grade separated intersection can be given as typical examples of areas where the turning position P of the vehicle V is an entrance point to the side road SW of the road RD.

As illustrated in FIG. 10A, when the vehicle speed is low, the display timing of the direction guide image 200 is a moment when the vehicle V approaches the turning position P where the vehicle V changes its course toward the side road SW. In this case, the display timing of the direction guide image 200 is set to be a first predetermined time (for example, about 10 seconds) before the timing at which the vehicle V reaches the turning position P.

Meanwhile, as illustrated in FIG. 10B, when the vehicle speed is high, the display timing of the direction guide image 200 is such a moment that a sufficient margin is secured before the turning position P. In this case, the display timing of the direction guide image 200 is set to be a second predetermined time (for example, about several tens of seconds) before the timing at which the vehicle V reaches the turning position P. In other words, when the vehicle speed is high, the timing of starting the display of the direction guide image 200 is earlier than that in a low vehicle speed.

As described above, in the display example 4, there is used such a display pattern that the higher the traveling speed (vehicle speed) of the vehicle V is, the earlier the timing of starting the display of the direction guide image 200 is.

In other words, in the display example 4, the display pattern is determined such that the higher the traveling speed of the vehicle V is, the larger the distance between the position corresponding to the turning position P in the display area DA and the bottom end B of the direction guide image 200 is.

The graph shown in FIG. 11A illustrates a relationship in which the display timing of the direction guide image 200 becomes earlier in direct proportion to an increase in the vehicle speed (in other words, a linear relationship).

Note that the display timing of the direction guide image 200 means time it takes from the start of the display of the direction guide image 200 to the timing at which the vehicle V reaches the turning position P.

The graph illustrated in FIG. 11B illustrates a relationship in which the display timing of the direction guide image 200 becomes quadratically earlier as the vehicle speed increases.

One or more of the aforementioned embodiments may have one or more of the below effects.

As described in the display examples 1 to 3, the vehicular display device 100 determines the display pattern such that the higher the traveling speed of the vehicle V is, the longer the length from the top end T to the bottom end B of the direction guide image 200 is.

Accordingly, when the vehicle V is traveling at high speed, the driver starts seeing the direction guide image 200 in the display area DA from a prior position. Hence, when the time it takes to reach the turning position P becomes shorter, the vehicular display device 100 can make the driver recognize the turning position P at an earlier timing.

Meanwhile, when the vehicle V is traveling at low speed, the driver does not have to concern about the relationship between the direction guide image 200 and the turning position P until the vehicle V approaches the turning position P to some extent.

As described above, when the traveling speed is high, the vehicular display device 100 can show the driver the position to make a turn with a sufficient margin. Meanwhile, when the traveling speed is low, the vehicular display device 100 can reduce botheration caused by displaying the direction guide image 200 far before the turning position P and a possibility of the driver erroneously recognizing a different intersection before the turning position P as the position to make a turn.

In other words, when displaying the direction guide image 200 along with the road RD viewed by the driver through the windshield FW of the vehicle V, the vehicular display device 100 can more surely show the driver the turning position P to make a turn at any traveling speed.

More specifically, how the road RD appears to the driver and the time it takes to reach the turning position P such as an intersection change depending on the vehicle speed, and the vehicular display device 100 can display the direction guide image 200 in a manner superimposed on the road RD while adjusting the direction guide image 200 to these changes.

Achieving such display of the direction guide image 200 can greatly reduce an operation of the driver checking the turning position P based on a road map displayed on a car navigation system or the like.

An effect of such display is very large. Time taken by the driver to view information displayed on the car navigation system is said to 1.5 seconds in average. Meanwhile, time taken by the driver to view information displayed on the head-up display (HUD) such as the vehicular display device 100 is said to 0.2 seconds in average. In other words, achieving the aforementioned display with the vehicular display device 100 can constantly reduce time in which the line of sight is moved, by about 87%.

Moreover, displaying the direction guide image 200 for each turning position P as described above can achieve a route guide (guidance to a destination) which is easy to understand as in a car navigation system, by using a HUD like the vehicular display device 100.

In one or more embodiments of the present invention, the display pattern can be determined such that the higher the traveling speed of the vehicle V is, the longer the length of the direction guide image 200 along the road RD is (see the display example 1). The driver can thus recognize the turning position P at an earlier timing when the vehicle V is traveling at high speed. Particularly, since the length of the direction guide image 200 along the road RD is longer, the vehicular display device 100 can make the driver easily recognize the distance to the turning position P.

In one or more embodiments of the present invention, the display pattern can be determined such that the higher the traveling speed of the vehicle V is, the greater the number of the guide icons 210 is (see the display example 2). Particularly, since the number of the guide icons 210 in the traveling direction of the vehicle V is greater, the vehicular display device 100 can make the driver easily recognize the distance to the turning position P.

In one or more embodiments of the present invention, the display pattern can be determined such that the higher the traveling speed of the vehicle V is, the larger the intervals between the guide icons 210 are (display example 3). Particularly, since the intervals between the guide icons 210 in the traveling direction of the vehicle V are larger, the vehicular display device 100 can make the driver easily recognize the turning position P without hindering the visibility of the road RD on which the direction guide image 200 is superimposed.

In one or more embodiments of the present invention, the display pattern can be determined such that the higher the traveling speed of the vehicle V is, the larger the distance between the position corresponding to the turning position P in the display area DA and the bottom end B of the direction guide image 200 are (display example 4).

Specifically, when the turning position P of the vehicle V is a position where a turn to the side road SW is to be started, the display pattern can be determined such that the higher the traveling speed of the vehicle V is, the earlier the timing of starting the display of the direction guide image 200 is. Particularly, since the timing of starting the display is made earlier instead of changing the shape of the direction guide image 200, the vehicular display device 100 can make the driver easily recognize the turning position P when the vehicle is traveling on an expressway or the like and the vehicle speed is very high.

Other Embodiments

Although embodiments of the present invention are described above using examples, the present invention is not limited to the aforementioned description. It is obvious to those skilled in the art that various modifications and improvements can be made.

For example, in one or more of the aforementioned embodiments, the direction guide image 200 is configured by the multiple guide icons 210. However, the direction guide image 200 does not have to be configured by the multiple guide icons 210 and may be configured by, for example, one icon with a shape of a long arrow.

Moreover, although the vehicular display device 100 includes the forward road condition detector 130 as illustrated in FIG. 2, the forward road condition detector 130 is not essential.

Furthermore, the host vehicle position detector 110, the map data holder 140, and the HUD image display 170 are also not essential in the vehicular display device 100.

The host vehicle position detector 110 and the map data holder 140 may be provided as a function of a route guide device (car navigation system). The HUD image display 170 may be used also for display of other images.

Moreover, although the HUD image display 170 (head-up display) which reflects an image by using a mirror and displays it on the windshield as a virtual image is described in one or more of the aforementioned embodiments as an example, the head-up display is not limited to this type.

For example, the HUD image display 170 may be a combiner type head-up display which uses a transparent panel instead of displaying an image on the windshield FW or a type which directly displays an image on the windshield FW. In other words, the HUD image display 170 according to one or more embodiments of the present invention only has to display information in a manner superimposed on an object viewed by the driver through the windshield FW without making the driver look down.

Although the four-wheel passenger car (including SUV and minivan), the truck, and the bus are given as the examples of the vehicle V in one or more of the aforementioned embodiments, the vehicular display device 100 may be applied to a three-wheeler and a motorcycle.

Although embodiments of the present invention have been described above, it should be understood that the description and drawings forming part of this disclosure are not intended to limit the present invention. From this disclosure, various alternative embodiments, examples, and operations techniques will be found by those skilled in the art. Accordingly, the scope of the invention should be limited only by the attached claims.

REFERENCE SIGNS LIST 100 vehicular display device
110 host vehicle position detector
111 host vehicle position detection sensor
113 coordinate detector
115 reference point calculator
120 vehicle speed detector
130 forward road condition detector
140 map data holder
150 display pattern determiner
160 display processor
170 HUD image display
200 direction guide image
210 guide icon
B bottom end
DA display area
FW windshield
P turning position
RD road
SW side road
T top end
V vehicle

The invention claimed is:

1. A vehicular display device, comprising:
a display configured to display an image in a display area that overlaps a position of a windshield of a vehicle;
a display processor configured to display a direction guide image in the display area in a manner superimposed on a road on which the vehicle is traveling, the direction guide image being an image showing a turn position where the vehicle is to make a turn on the road; and
a display pattern determiner configured to determine a display pattern of the direction guide image based on a traveling speed of the vehicle,
wherein the display pattern determiner determines the display pattern such that, the higher the traveling speed is, the longer a length from a top end to a bottom end of the direction guide image is,
wherein the display processor displays the direction guide image in the display area based on the display pattern determined by the display pattern determiner,
wherein the direction guide image includes a plurality of guide icons indicating a traveling direction and arranged along the road, and
wherein the display pattern determiner determines the display pattern such that, the higher the traveling speed is, the larger an interval between the guide icons is.

2. A vehicular display method, comprising:
determining a display pattern of a direction guide image that is an image showing a turn position where the vehicle is to make a turn on a road on which the vehicle is traveling;
displaying the direction guide image in a display area that overlaps a position of a windshield of a vehicle based on the determined display pattern; and
determining the display pattern of the direction guide image such that, the higher a traveling speed of the vehicle is, the longer a length from a top end to a bottom end of the direction guide image, wherein the direction guide image includes a plurality of guide icons indicating a traveling direction and arranged along the road, and wherein the determining the display pattern is performed such that, the higher the traveling speed is, the larger an interval between the guide icons is.

* * * * *